(12) United States Patent
Roberts

(10) Patent No.: US 6,599,128 B2
(45) Date of Patent: Jul. 29, 2003

(54) GAME FOR TRAINING OF MANAGERS

(76) Inventor: Ronald J. Roberts, 528 Elizabeth Dr., Eagleville, PA (US) 19403

( * ) Notice: Subject to any disclaimer, the term of this patent is extended or adjusted under 35 U.S.C. 154(b) by 64 days.

(21) Appl. No.: 09/934,897

(22) Filed: Aug. 21, 2001

(65) Prior Publication Data

US 2003/0039946 A1 Feb. 27, 2003

(51) Int. Cl.[7] ............................. G09B 19/22; A63F 3/00
(52) U.S. Cl. ........................................ 434/128; 273/276
(58) Field of Search ................................ 434/128, 107, 434/236, 247, 255; 273/236, 244, 276, 444, 453; 705/10, 11

(56) References Cited

U.S. PATENT DOCUMENTS

| | | | | |
|---|---|---|---|---|
| 4,071,244 A | * | 1/1978 | Richards | 273/275 |
| 4,226,421 A | * | 10/1980 | Shimizu | 273/275 |
| 5,762,503 A | * | 6/1998 | Hoo et al. | 434/237 |
| 6,079,984 A | * | 6/2000 | Torres et al. | 434/247 |
| 6,254,101 B1 | * | 7/2001 | Young | 273/460 |

* cited by examiner

Primary Examiner—Derris H. Banks
Assistant Examiner—Kurt Fernstrom
(74) Attorney, Agent, or Firm—William H. Eilberg

(57) ABSTRACT

A game for training of managers includes a playing area having an annular path with color-coded spaces, a material storage area, a set of home bases, and a plurality of small islands. The players are told that the object of the game is to accumulate bridge-building elements from the storage area, and to build bridges to the small islands so as to retrieve and solve a puzzle found on each island. The game is designed to teach the players, in a humorous and non-threatening way, the importance of strategic planning and cooperation among departments of an organization. A portable version of the game is played on a game board which has most of the elements as the large game, in miniature. The portable version does not include the puzzle, but does allow its players to develop strategy and to learn the value of teamwork.

29 Claims, 9 Drawing Sheets

TAKE a bridge building piece from the reserve pile.

PUT BACK one of your bridge building pieces in the reserve pile.

STEAL a bridge building piece from another player.

GIVE a bridge building piece to another player.

GAME FOR TRAINING OF MANAGERS

BACKGROUND OF THE INVENTION

The present invention is a game that is intended to train managers, and other employees, of organizations large and small, to think more creatively, and to cooperate more effectively in managing the organization.

Large corporations often have many departments, and may employ thousands, or even hundreds of thousands, of persons. The organizational charts describing such businesses can become very large and complex, and a manager in one department is usually unaware of the circumstances of his or her counterparts in another department. Indeed, the various departments or divisions of a large corporation may function autonomously, and may even behave as competitors of each other.

The management of large organizations, as well as relatively small organizations, such as business corporations, therefore requires the coordination of effort among various divisions, departments, and subsections, such that all components of the organization operate in a manner that maximizes the benefit for the organization as a whole.

Many corporate managers are taught to view business as a competitive sport. Such managers adopt an aggressive attitude towards the management of their organizations, and may be determined to "win at all costs". Such an attitude may have positive effects, in motivating the manager to exert maximum effort. But this attitude also may mean that a greater benefit to the larger organization could be lost due to an individual manager's excessive desire to achieve a specific goal for his or her department. In an efficiently managed organization, all parts of the organization operate harmoniously, each being aware of the needs and desires of the other, and each being aware that working together can maximize profit for all.

The present invention is a game that is intended to train managers and/or other personnel, especially those working in corporations or other organizations, in an entertaining and non-threatening way, to think and plan more creatively in managing their organizations. The present invention also provides a game which can be played, primarily for fun, by children or adults.

SUMMARY OF THE INVENTION

The present invention is a game played on a large, flat playing area, large enough to allow a number of players to walk through it. The playing area has a preferably annular path with a plurality of color-coded spaces, a material storage area, a plurality of home bases, and a plurality of small islands. The players are told that the object of the game is to accumulate bridge-building elements, stored in the material storage area, according to specified rules, and to build a bridge to the nearest small island, so as to solve a puzzle located on the small island in the shortest possible time.

The players are divided into teams, and each team chooses a leader who repeatedly rolls a die or spins a wheel, to generate random integers governing the movement of the players. The players traverse the path in accordance with these random numbers.

The actions of the players are determined in part by the color of each space on which a player lands. For example, if a player lands on a blue space, the player must take a bridge-building element from the storage area. If a player lands on a green space, the player must return a bridge-building element to the storage area. If a player lands on a red space, the player must steal a bridge-building element from another team. If a player lands on a yellow space, the player must give a bridge-building element to another team. In the preferred embodiment, the players of the various teams proceed simultaneously, usually resulting in a chaotic environment. If the action required is not possible, the player does nothing and the turn is wasted. For example, if the player lands on a blue space, but there are no more bridge-building elements in the storage area, the player does nothing.

When a team has accumulated enough bridge-building elements to build a bridge, and when all members of the team, except the leader, have traversed the path at least once, the team may begin to build a bridge to the nearest small island. The members of the team then travel along the bridge, their steps being again governed by random numbers determined by the leader, and they reach the small island, on which there is a bag containing pieces of a jigsaw puzzle. In the preferred embodiment, the puzzle pieces are placed on the small islands such that no team has a complete set of puzzle pieces, and each team must cooperate with the other teams to solve the puzzle. The ultimate purpose of the game is to teach the players, in a humorous and enjoyable way, the importance of strategic planning and cooperation in managing organizations.

Another embodiment comprises a portable version of the above described game. A game board contains all of the components of the playing area described above, except that these components are in miniature, and are generally symbolic. In playing the board game, the players move a set of game pieces around the board. Thus, each player of the board game takes the role of the team leader in the large game. The winner of the game is the first player whose game pieces have all walked across the bridge to the small island. In the preferred embodiment of the miniature version, there is no puzzle on the small islands.

The invention also includes apparatus for playing both the large game and the miniature version described above. For the large game, one requires either a playing area marked as shown in FIG. 1, or a means for making such markings on a large, flat surface. One also requires a plurality of bridge-building elements, a plurality of tables, or their equivalents, for use as home bases, and a random number generating means, such as a spinner or dice. One also should provide puzzle pieces, as described above, in bags located on each of the small islands.

For the miniature version, the apparatus includes a portable game board having the features discussed above. In addition, there are provided a plurality of game pieces, which players move around the board as described. Also, the apparatus may include a set of cards which summarize the rules governing the acquisition or loss of bridge-building materials.

The present invention therefore has the primary object of providing a management training game.

The invention has the further object of teaching managers the importance of teamwork and cooperation in an enjoyable and non-threatening way.

The invention has the further object of providing a management training game in which players move around a large playing area and simulate the building of bridges.

The invention has the further object of providing a game played on a portable game board, to provide simple fun for children, and to provide a game of greater complexity and challenge for teenagers and adults.

The reader skilled in the art will recognize other objects and advantages of the present invention, from the following brief description of the drawings, the detailed description of the invention, and the appended claims.

DETAILED DESCRIPTION OF THE INVENTION

Figure 1:
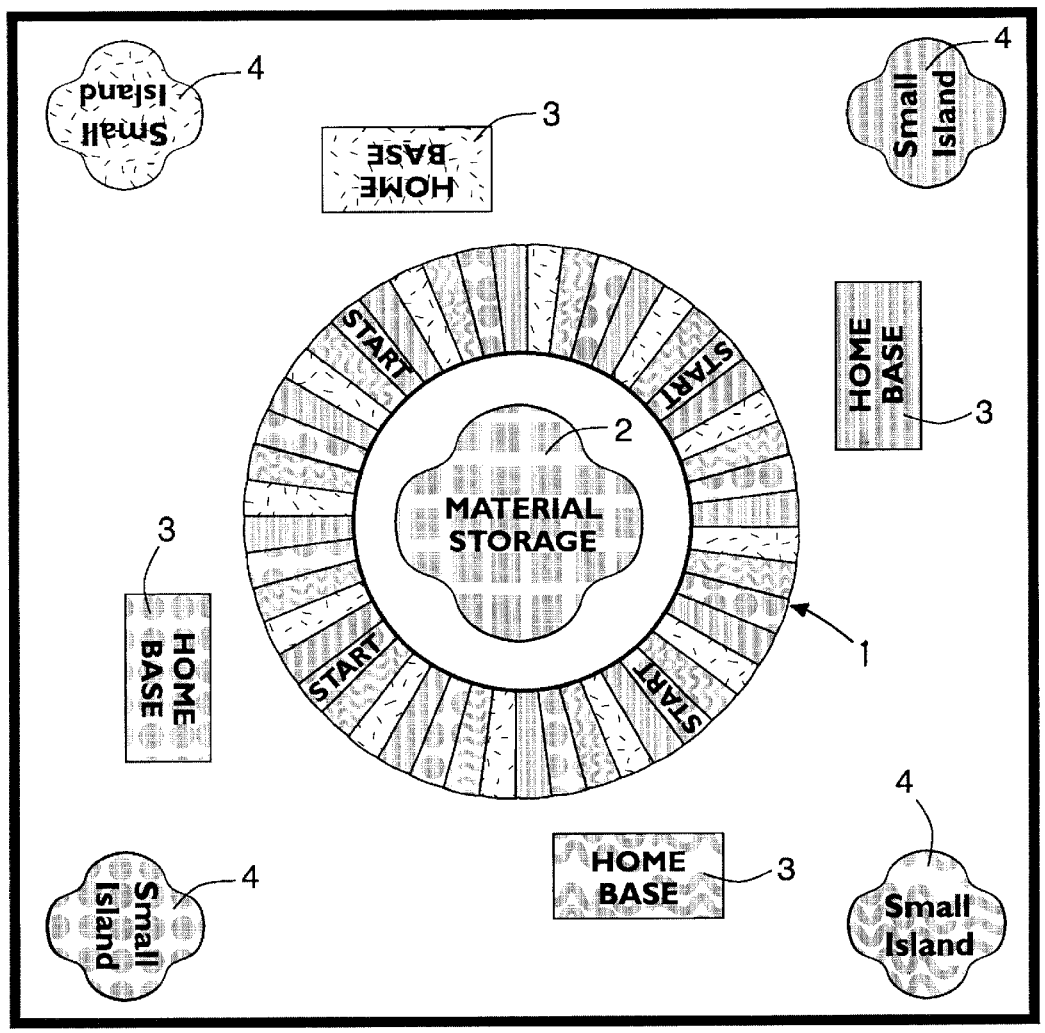
FIG. 1 provides a plan view of the playing area used in playing the game of the present invention.
Figure 1:
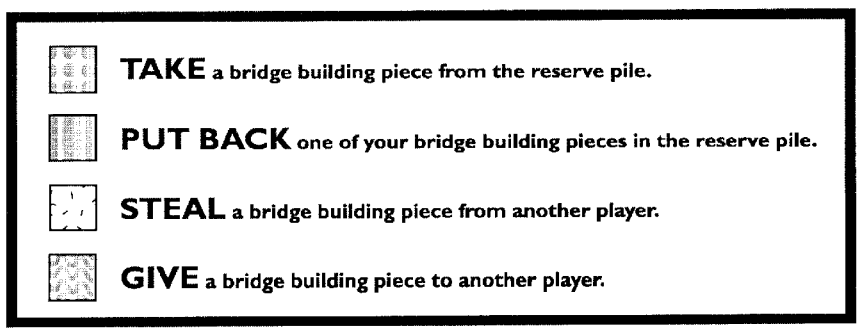

The game of the present invention is preferably played on a large, flat playing area, shown schematically in FIG. 1. The playing area includes an annular path 1 having a plurality of color-coded spaces. The annular path surrounds a region 2 designated "material storage". The annular path 1 and region 2 are collectively called the "big island". Adjacent to the big island are a plurality of regions 3, each designated as a "home base". In the preferred embodiment, each home base is a table, but it can be configured differently, within the scope of the invention. For example, the home base can simply be a delineated region on the playing surface. The playing area also includes a plurality of regions 4 which are called "small islands". The small islands are the farthest objects from the big island, within the playing area.

In a preferred embodiment, the annular path 1 may have a diameter of about 30 feet, and the small islands may have a diameter of about 10 feet, the small islands being located about 15 feet from the annular path. The tables may be about 3×6 feet. All of these dimensions are exemplary only, and the invention is not to be deemed limited by these particular values. Many different sizes can be chosen for the various components of the game.

In the preferred embodiment, there are four home bases 3 and four small islands 4, because the game is preferably played with four teams. There could instead be three home bases, in which case there would be three small islands. The home bases and the small islands are preferably color-coded to correspond to colors associated with each team. The game can be played with more or fewer teams, in which case the number of home bases and small islands can be adjusted accordingly.

The spaces formed on path 1 are also color-coded. The color codes on this path, however, do not correspond to the teams playing the game, and it is preferred that the color codes on the path 1 be different from those used to identify the teams. The colors on path 1 serve as indicators, telling the players what action should be taken when a player reaches a particular space, as will be described below.

The game is played in the following manner. The participants are divided into teams of equal size. In the preferred embodiment, in which each team is associated with a color, the members of each team wear smocks having the color corresponding to their team. Other means of identifying the members of the teams could be used, within the scope of the invention.

For optimum results, the number of teams should not exceed four, and the number of players on each team should not exceed 15. There should be at least three teams, each having at least three players.

The players are told that the object of the game is to build a "bridge" from the big island to a small island, and to retrieve and solve a puzzle located on the small island. Each team seeks to build a bridge to the small island associated with that team. The bridge is to be built with materials stored in the material storage area 2 of the big island. The players are also told that they must solve the puzzle in the shortest possible time. There is a time limit imposed for the overall game, and the players are informed of this fact. The preferred time limit is 20 minutes.

Figure 6:
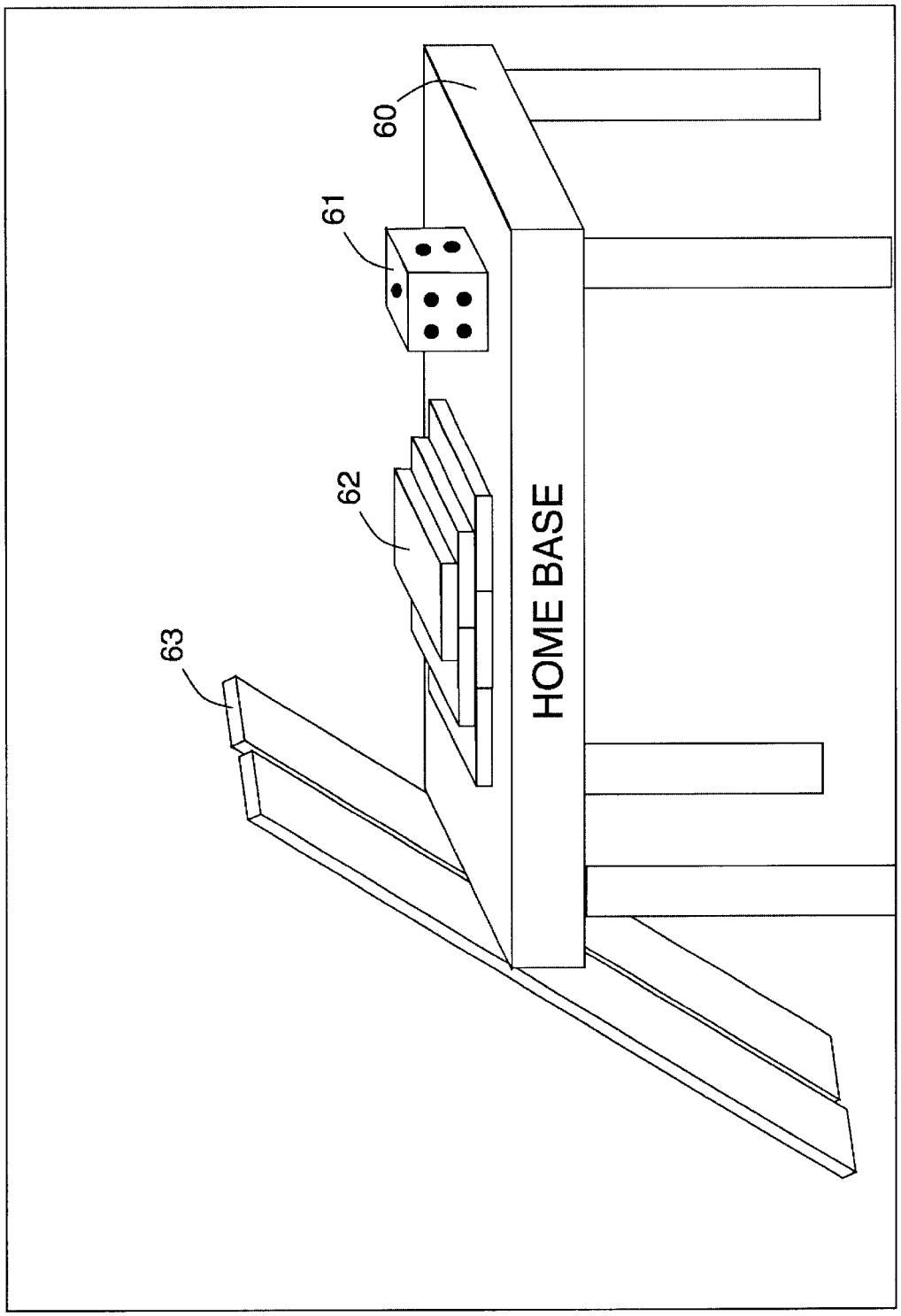
FIG. 6 provides a perspective view of one of the home base tables used in the game shown in FIGS. 1–5.

At the beginning of the game, the members of each team stand near the home base 3 for the team. The team members select a leader who will spin a wheel or roll one or more dice, to determine the movements of each member of the team. FIG. 6 shows a table 60, used as a home base, together with die 61, and base supports 62 and planks 63. The base supports and planks comprise bridge-building elements, to be used by the players to build the bridge. The players of each team may not begin to build the bridge until they have circled the annular path at least once, thus passing their starting point on the path. The latter requirement does not apply to the leader.

Before the play begins, the players of each team (except the leaders) line up behind their respective starting space, in an area across from the leader and inside the path 1.

On the first move for a team, the leader spins a wheel or rolls a die, obtaining a random integer between 1 and 6. The first player then steps onto the path, starting at the space marked "start" located closest to the home base for that team, and advances through the number of spaces corresponding to the number announced by the leader. The leader then repeatedly obtains more such random numbers, again by spinning a wheel or rolling a die, or by any equivalent means. For each random number, the leader either assigns that number to another player who has not yet entered the annular path, enabling that player to begin his or her trip around that path, or to a player who is already on the path. The decision whether to assign a number to a player already on the annular path, or to a player not yet on that path, is a strategic decision which depends on the positions of each player, and the instructions associated with each space, as will be described below. The same statement is true with regard to the decision of which of several players, already on the path, should move during the next turn. These decisions are made based on which space a player would reach if that player moved the determined number of spaces. Thus, the leader must not only determine the random number, but must also analyze the position of the players on the path, to decide which one should be moved next, to obtain the maximum strategic advantage. The intermediate goal, during this phase of the game, is to obtain as many bridge-building elements as possible.

In the preferred embodiment, the players move around the path in a clockwise direction. However, it is possible to play the game wherein the players move in the counterclockwise direction. It is preferred that all of the players move in the same direction.

When a player arrives at a particular space on the path, he or she must take a specific action according to the color of the space. By "arriving" or "landing" at a space, it is meant that the player has moved through a number of spaces corresponding to the random number determined by the team leader, and now occupies the last such space in the sequence. The color of that space determines what the player must do.

If the player arrives at a blue space, the player must take a bridge-building element from the material storage area 2. To do so, the player temporarily leaves the space on the path, takes a bridge-building element from the material storage area, and brings that element to the home base for his or her team, before returning to his or her space on the path. Alternatively, if there are players not yet on the path, still waiting to start, one such player may assist the designated player by bringing the element to the home base, so that the first player need not leave the path. The element should be stored in a manner that makes it visible to all. If the home base is a table, the bridge-building element should be placed on the surface of the table.

If the player arrives at a green space, the player must take a bridge-building element from the home base and return it to the material storage area 2.

If the player arrives at a red space, the player must steal one bridge-building element from the home base of one other team. The player may choose the other team from which to steal. The element may be stolen from a team even while that team is building a bridge, thus forcing that team to obtain one or more replacement bridge-building elements.

If the player arrives at a yellow space, the player must take a bridge-building element from the home base of his or her team, and give that element to another team, by delivering the element to the home base of such other team.

If, upon reaching a particular space, a player is required to take an action that is impossible, the player simply does nothing, and the turn is wasted. For example, if the player arrives at a blue space, and there are no bridge-building elements in the material storage area, the player can do nothing. If the player lands on a green space, and his team has no bridge-building elements, then the player can do nothing. It is the responsibility of the leader to assign moves, if possible, to those players whose moves will not be wasted in this manner.

The color code described above is only one example of coding schemes. Other coding schemes could be used instead. Not only is it possible to use colors that are different from those described above, but one could also use entirely different types of indicia, other than colors, to identify the spaces.

In the embodiment shown in the figures, there are twelve sets of spaces, each set containing four spaces having the four colors described above. Other arrangements could be devised, with different numbers of spaces, within the scope of the invention.

In the preferred embodiment, all of the teams play simultaneously. That is, each team leader repeatedly obtains random numbers, and directs the players of the team accordingly, without having to wait for other teams to make a move. Note that the "start" space for each team is different. Preferably, these "start" spaces are spaced at uniform intervals around the path, thereby allowing the various teams to start their trips around the path without unduly interfering with the movement of players of the other teams.

Before a team may begin to build a bridge, all of the players of the team (except the leader, who does not travel around the path) must complete at least one trip around the path. If all of the players (except the leader) have satisfied this condition, and if it is apparent that the team has enough material to build the bridge, the leader can call all of the players off the path, and instruct them to build the bridge. If there is not enough material to build the bridge, the play continues until the team has accumulated enough material. The leader need not wait for any or all players to reach a certain space. As long as each player has circled the path at least once, and as long as the team has accumulated the necessary material, the players can be told to begin building their bridge.

If, during the bridge-building phase, a team finds it is deficient in bridge-building elements (possibly because some elements have been stolen by another team), the leader must send one or more players back to the path, to continue their moves until the team has again accumulated the necessary bridge-building elements.

The base supports used to build the bridges preferably have a height or thickness of two inches or more, so as to support the planks which are laid upon the base supports. In this way, the actual structure assembled by the players resembles a real bridge or causeway. The exact nature of the bridge-building elements can be varied, as long as the elements can be arranged so that the players may walk on the bridge. For example, it is possible to build a "bridge" entirely of planks, laid end to end, on the playing surface.

Figure 2:
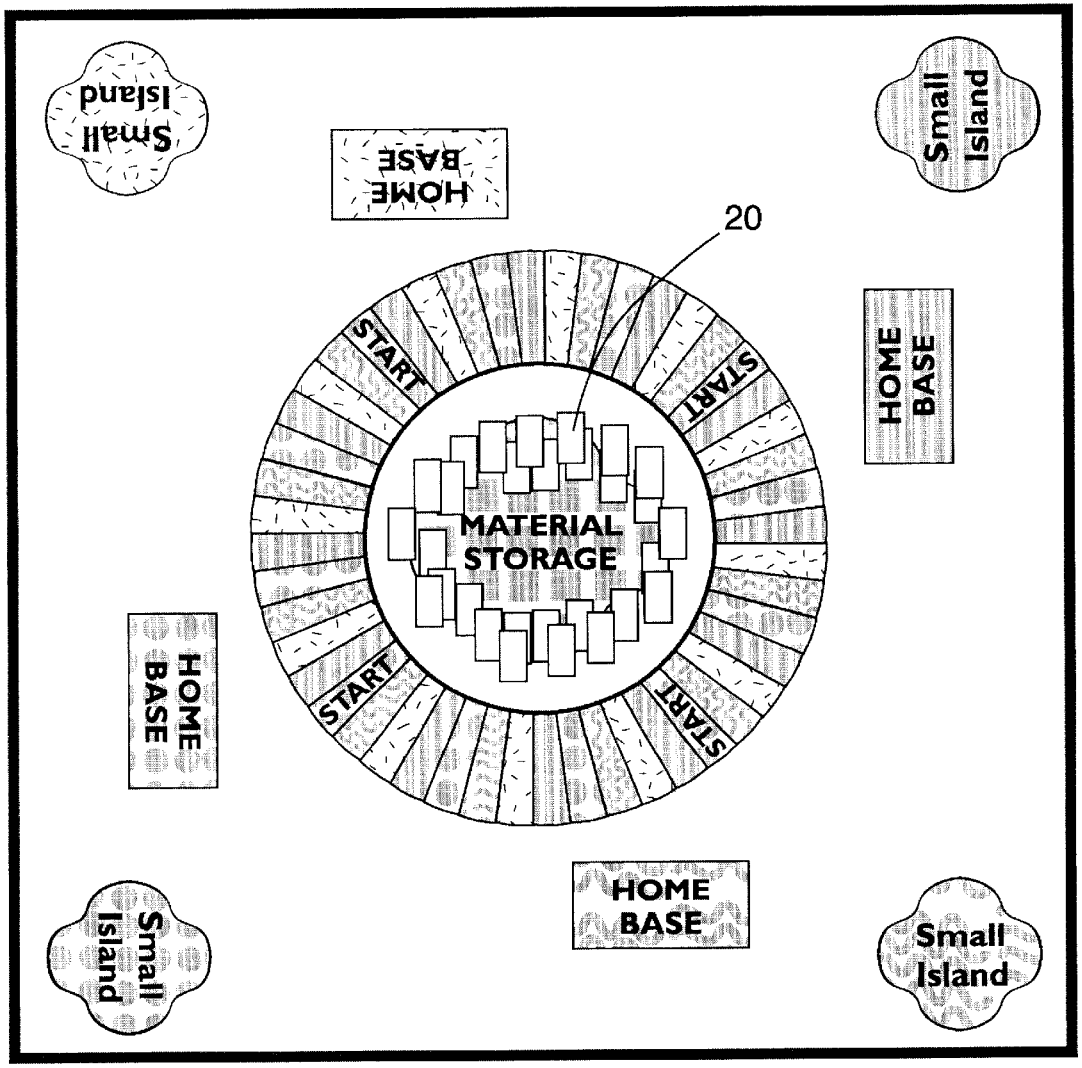
FIG. 2 provides a view similar to that of FIG. 1, but showing bridge-building materials stored in the center area.
Figure 3:
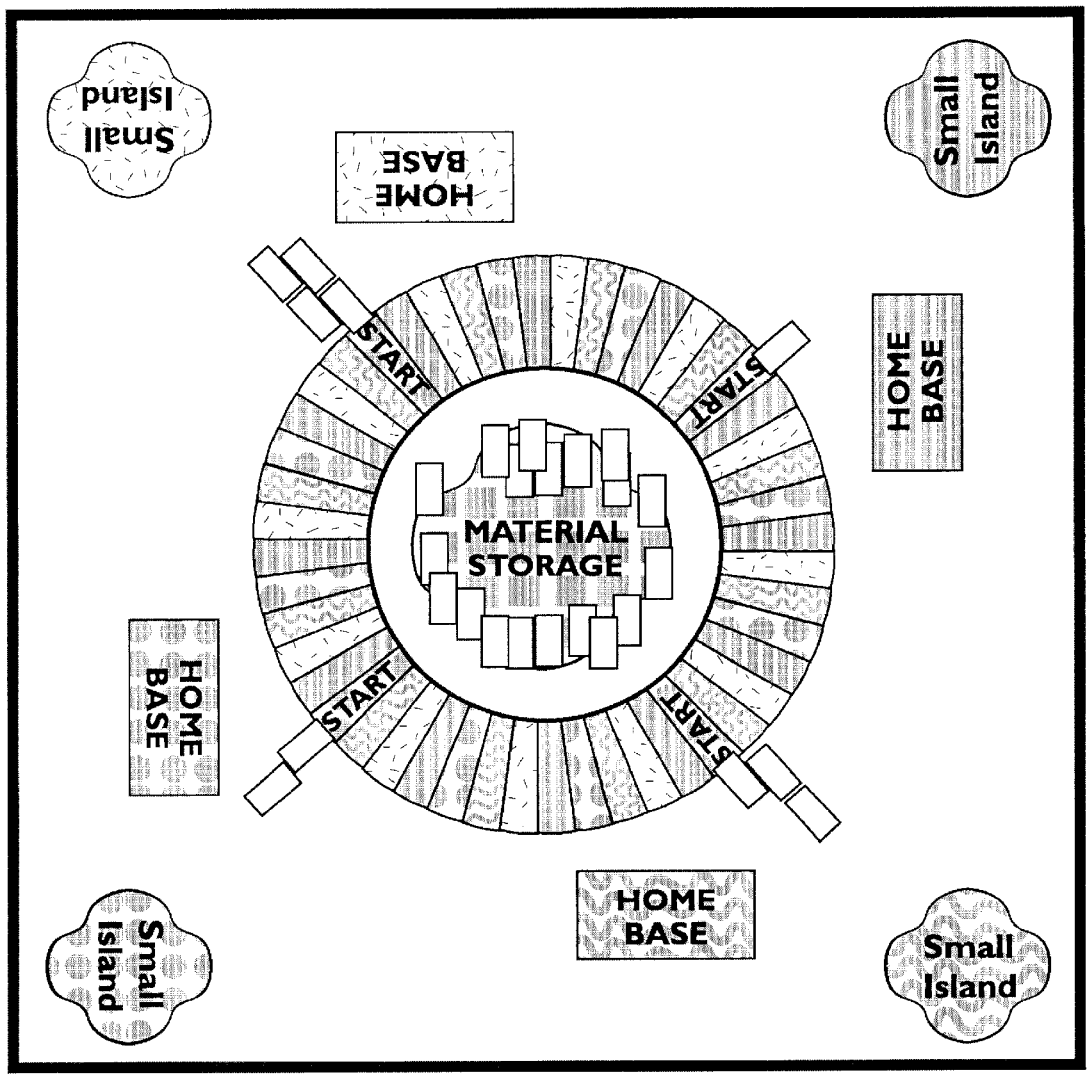
FIG. 3 provides a view similar to that of FIG. 2, but showing the beginning of the construction of bridges to the small islands.
Figure 4:
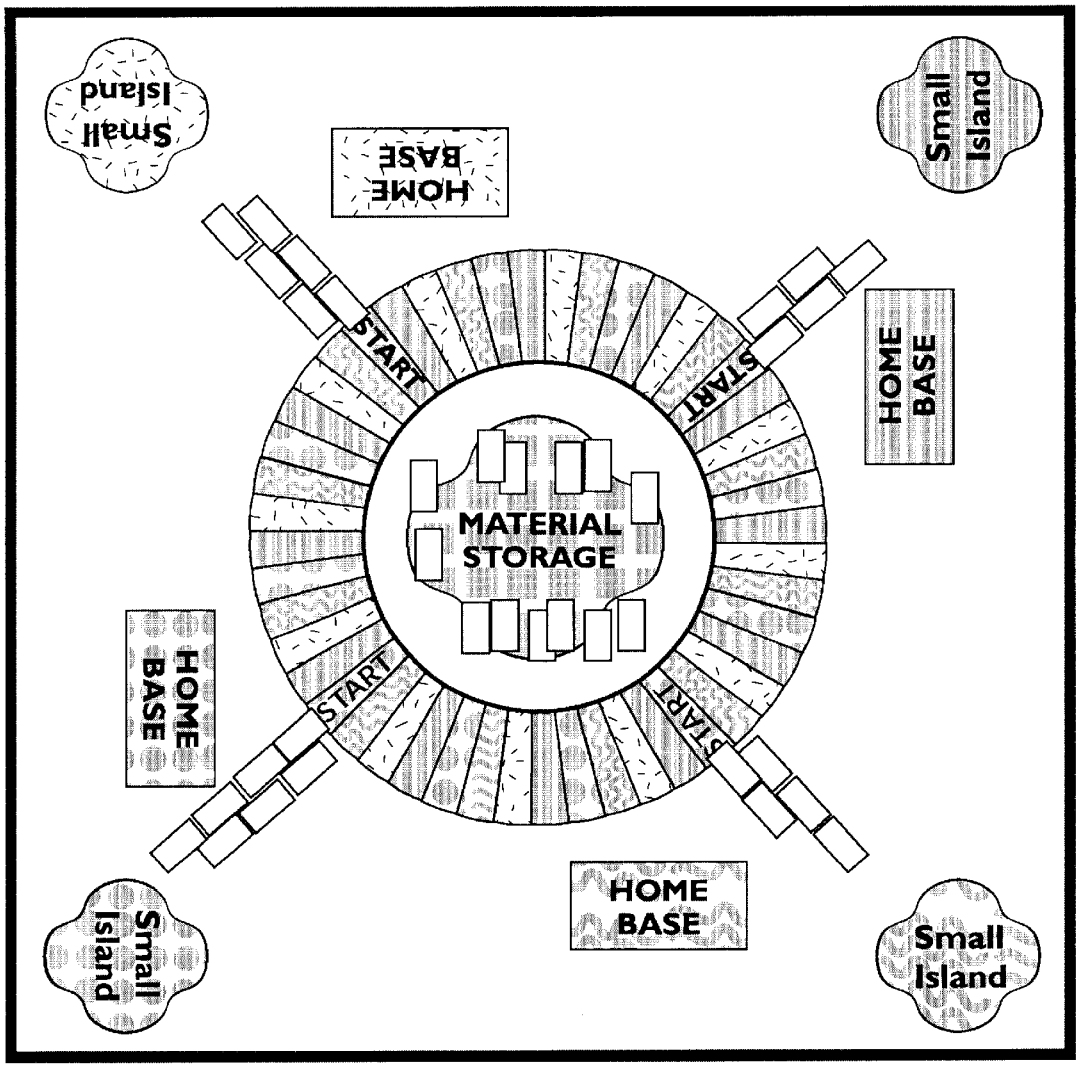
FIG. 4 provides a view similar to that of FIG. 3, showing further progress in the construction of the bridges.
Figure 5:
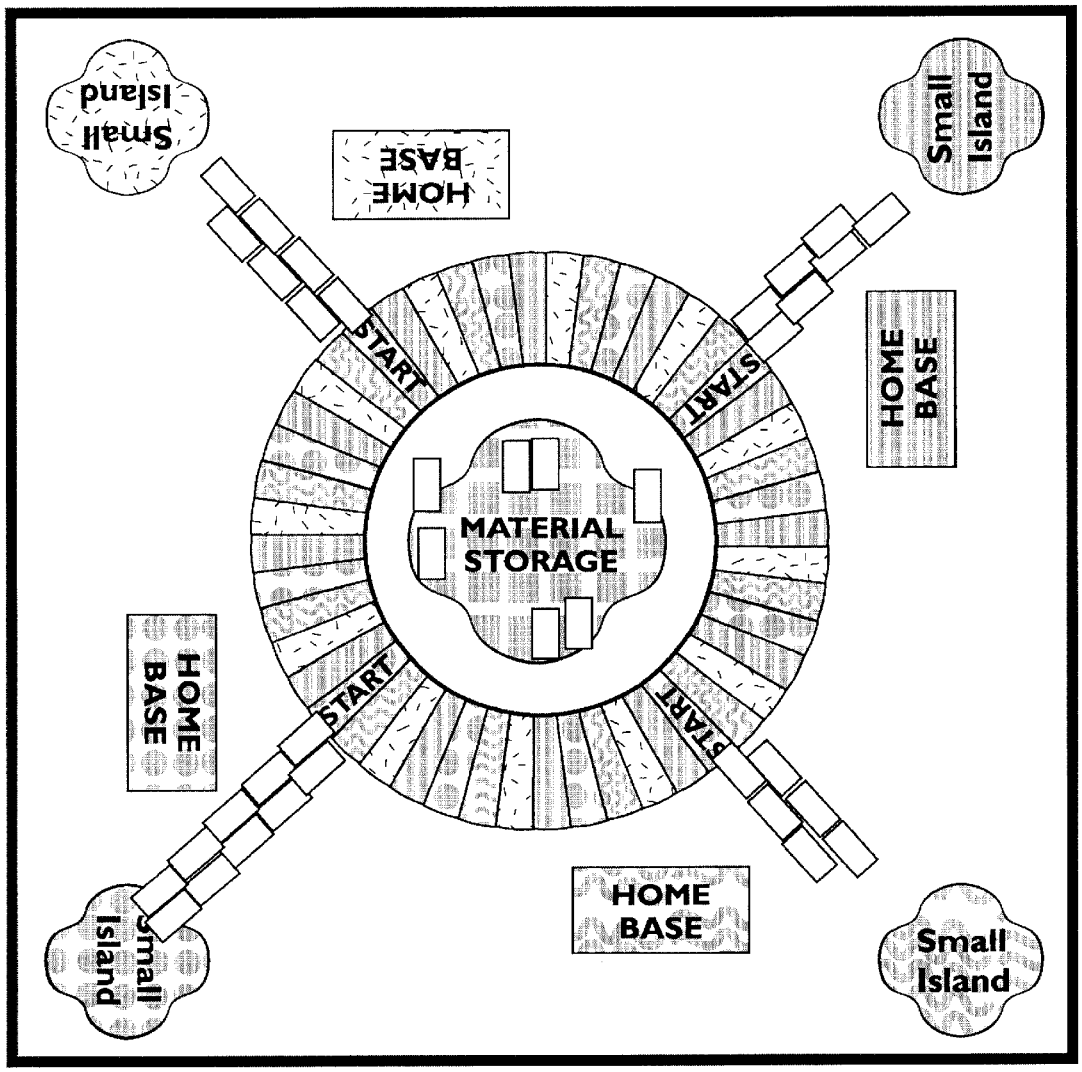
FIG. 5 provides a view similar to that of FIG. 4, showing one of the bridges completed, and showing the other bridges nearly completed.

FIGS. 2–5 show various stages in the process of bridge building. In FIG. 2, no bridge building has begun, and all of the bridge-building elements 20 are stored in the material storage area. In FIG. 3, players have begun to build bridges, though most of the bridge-building elements are still in the material storage area. In FIG. 4, the bridges are at least half completed, and there are fewer bridge-building elements in the storage area. In FIG. 5, one of the bridges is complete, and the others are nearly complete, with very few bridge-building elements remaining in the storage area.

Figure 7:
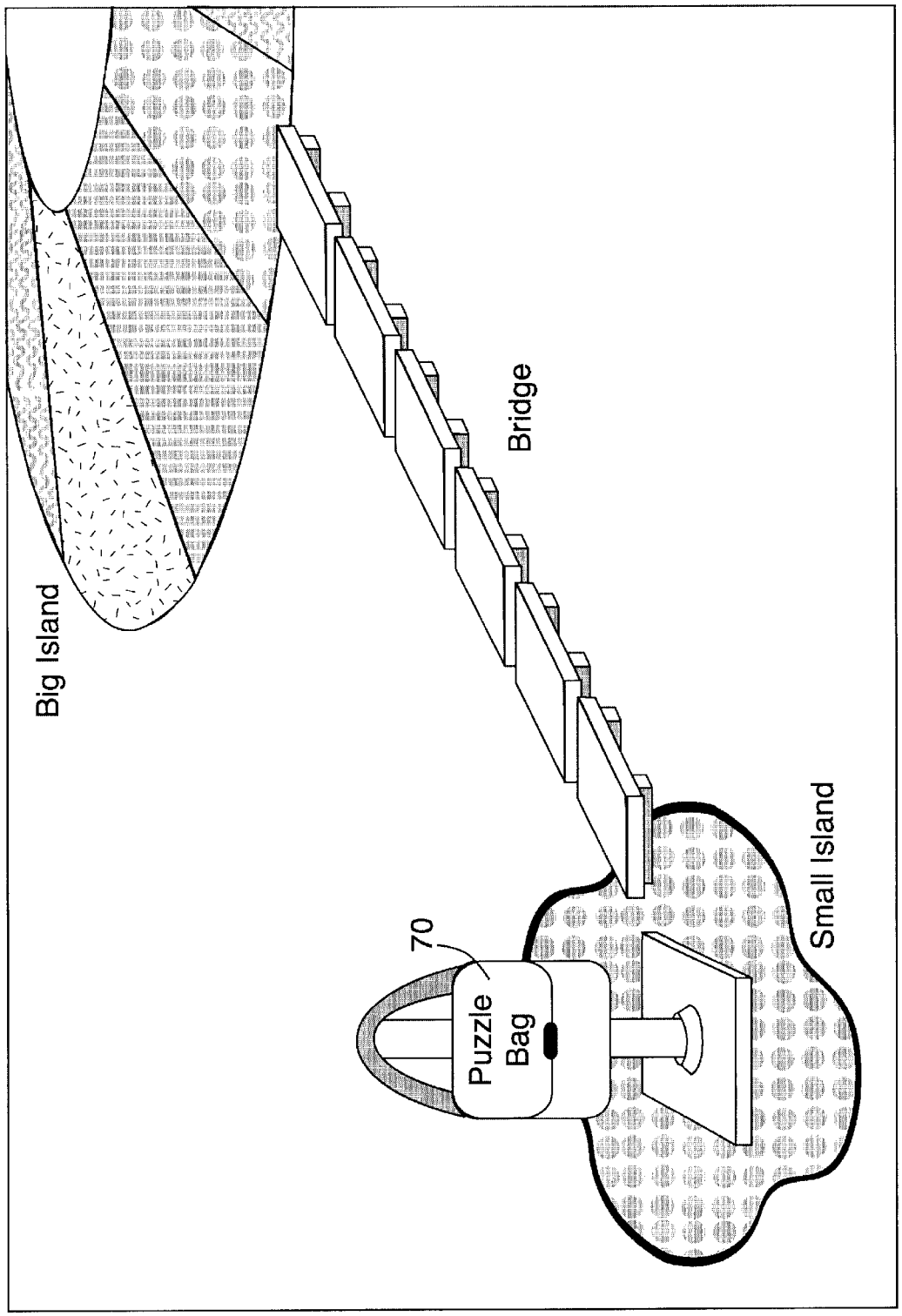
FIG. 7 provides a perspective view showing a bridge, built during the game of the present invention, to a small island, and showing the puzzle bag located on the small island.

Eventually, each team has built its bridge. After the bridge is completed, the players of a team walk on the bridge, from the big island to the small island associated with that team. FIG. 7 shows one such bridge. The travel of the players on the bridge is also governed by the random numbers generated by the leader. Only one player at a time may walk across the bridge to the small island.

In the preferred embodiment, the players then find pieces of a simple jigsaw puzzle, in a bag 70 on the small island, as shown in FIG. 7. The puzzle pieces are not difficult to assemble, so the players of each team will quickly realize that the puzzle pieces in their bag do not form a complete puzzle. Instead, each team has been given only a piece of the puzzle, so that no single team can solve the puzzle without cooperating with the other teams. The players are not made aware of the latter facts when they start to play the game.

Figure 8:
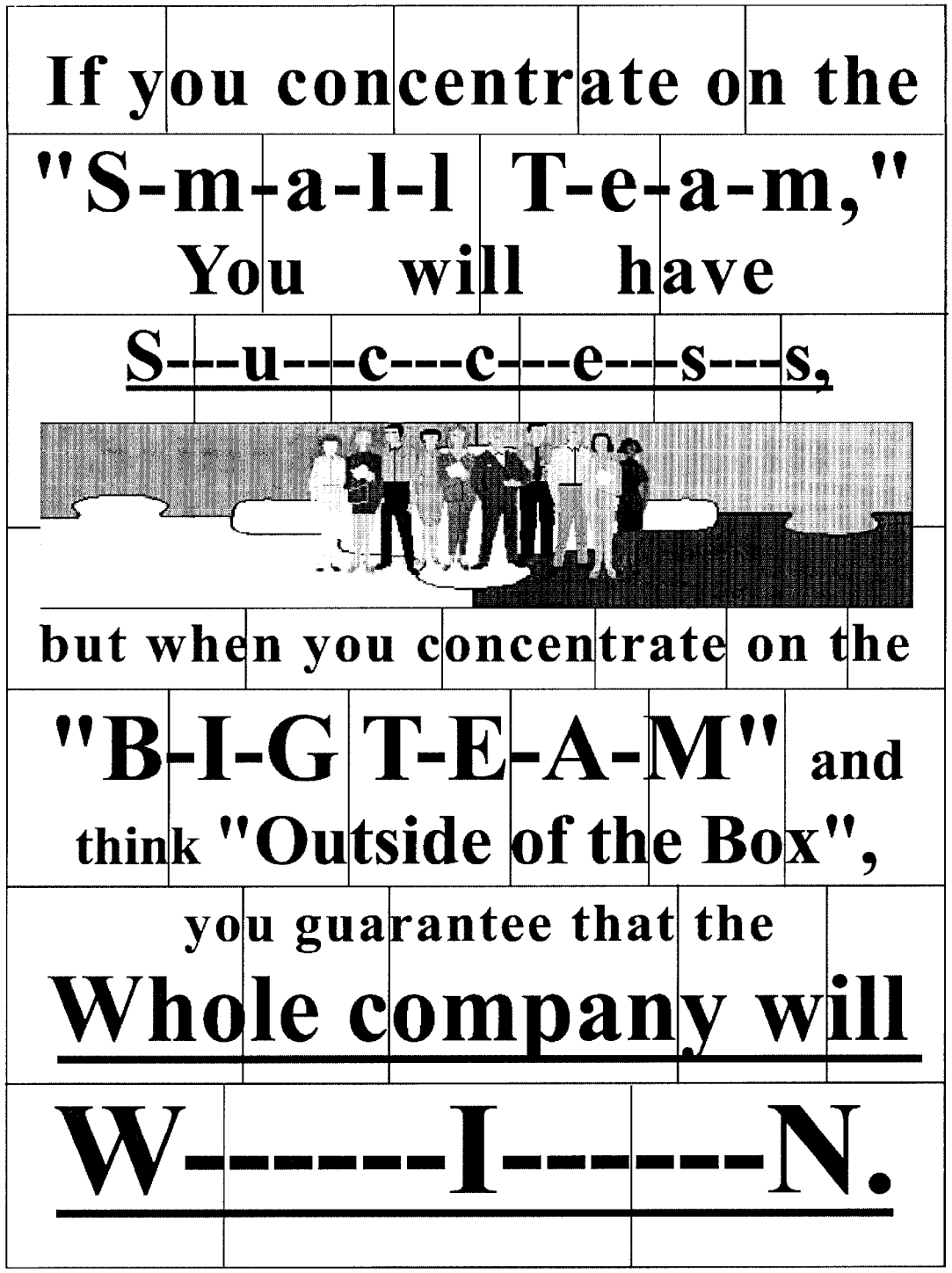
FIG. 8 provides a plan view of a completed puzzle, made according to the game of the present invention.

A completed puzzle is shown in FIG. 8. FIG. 8 shows the boundaries of each puzzle piece, the pieces being generally rectangular. In the preferred embodiment, each team may receive only one quadrant of the puzzle. Due to the simple shapes of the puzzle pieces, and due to the relatively small number of puzzle pieces, each team can easily assemble its part of the puzzle, and will easily realize that the puzzle cannot be solved without cooperating with the other teams.

In the preferred embodiment, the puzzle, when completed, conveys a message emphasizing the value of teamwork and cooperation, which is what the present game seeks to teach. However, the invention is not limited to any particular message, and other messages can be provided, within the scope of the invention.

The members of each team may informally divide themselves into sub-teams. For example, some members may become material gatherers and retrievers, while others can be bridge builders. In every case, however, all members of the team, except the leader, must travel around the annular path at least once before the team can begin to build a bridge.

The real purpose of the game becomes clear to the participants as they play, and especially after the game is concluded. The game teaches strategic planning, teamwork, communication, leadership, and change management. The game inherently creates chaos and confusion, because up to four teams play at once, without external supervision. The noise level typically becomes unbearable, as the members of all of the teams are yelling and screaming louder and louder, as they move further and further around the path. At their furthest point, many of the players may be about 30 feet away from the leader. Thus, it is difficult for the players to hear their instructions. Sometimes, the players will use hand signals. Other times, the smarter players will use other members of their team (who are waiting to start the game) to walk across the big island and convey an instruction to the appropriate players.

Since each player is responsible for picking up his or her own bridge-building elements from the material storage area of the big island, the possibility for cheating is great. In many rounds of the game, cheating may be rampant. Thus, the present game can be used by companies and other organizations to examine the issues of honesty and integrity. Moreover, since one of the possible instructions is to steal a bridge-building element from another team, the players are faced with a degree of ambiguity with regard to what is meant by a bridge-building "element". Some players may consider this instruction as a justification for overly aggressive actions.

The overall purpose of the game is initially hidden from the players. At first glance, the game appears to require the players to try to get as much as they can, and to assume that the winner is the team with the most material at the end of the game. However, the real purpose of the game is to show the value of teamwork and cooperation, and to show that one team cannot "win" without the cooperation of the other teams.

The premise of the game, therefore, is to teach the players that, to succeed, they must think beyond themselves and their own small teams, and must consider the overall needs of the "big team" or corporation. Instead of applying strategic selfishness, the players learn that the real solution depends on strategic selfless thinking. To optimize their likelihood of success, the players must ask themselves how all of the teams can work together to help each other. For example, a team member may ask himself, "How can I find out what the red team needs and give them some of my extra materials?" Or another team member may ask herself, "How can I ask the blue team to give me some their extra materials?" The team members should ask themselves how they can all agree to help each other out, without worrying only about their own performance or about the short-term goals of their own small team. If the leaders communicate with each other, then everyone can get what he or she needs. If the players all agree to work together, there is no need to yell and scream. The players can then slow down and communicate more effectively. There is less internal competition, and more efficiency throughout the entire group, which serves as a metaphor for an entire company or organization.

In the embodiment described above, the playing area is large enough to allow a plurality of players to walk through it. Another embodiment of the present invention comprises a portable game, one which is generally small enough to fit on an ordinary table. Except as otherwise stated, the portable board game is essentially the same as the large game described earlier.

The game set, in the portable game, includes the board itself, configured to define the annular path surrounding the material storage area, a plurality of home bases, and a plurality of small islands. Preferably, there will be four players, corresponding to the four teams of the large game, so there will be four home bases and four small islands. The number of home bases and small islands can be varied, within the scope of the invention. In addition to the board itself, the game set includes a plurality of game pieces, a plurality of miniature bridge-building elements, and a plurality of dice.

Figure 9:
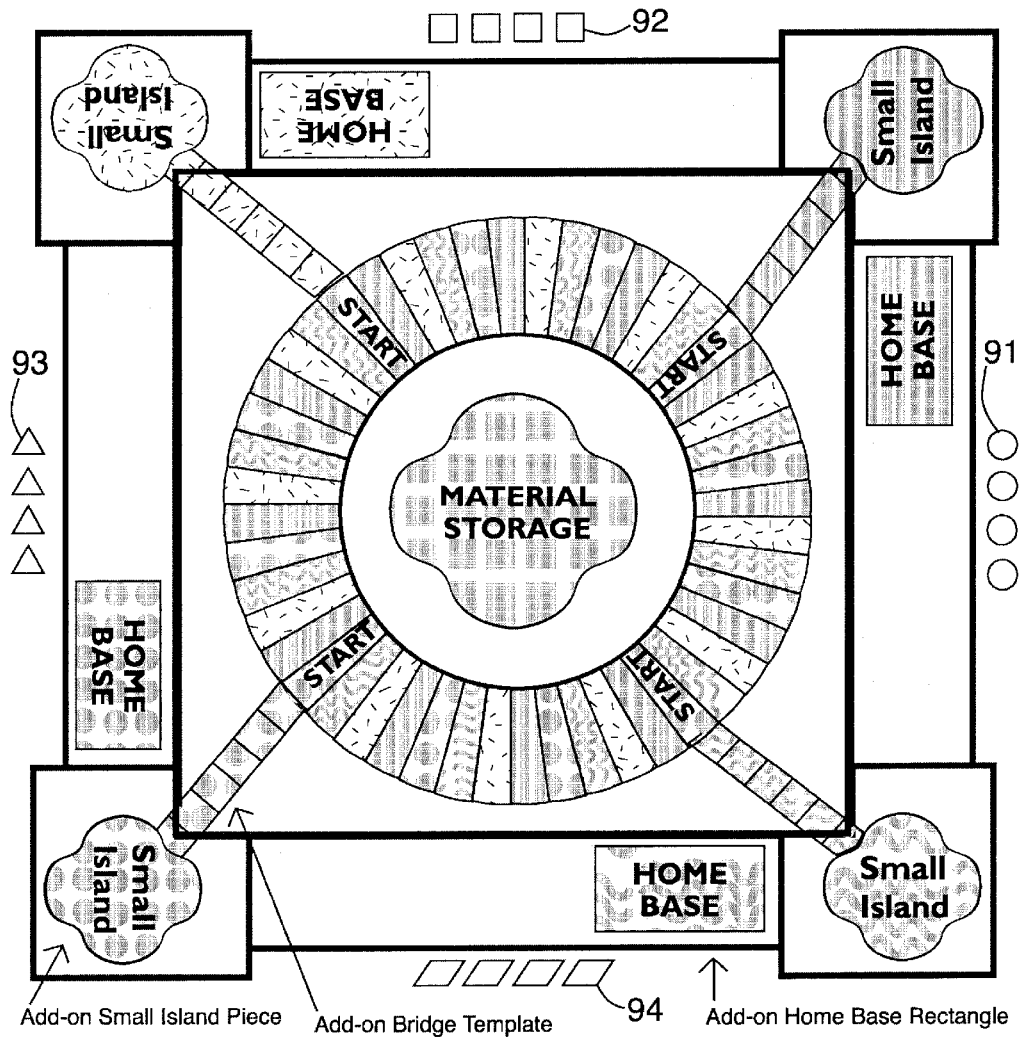
FIG. 9 provides a plan view of a game board used in a miniature version of the game of the present invention.

FIG. 9 shows a portable game board used in the present embodiment of the invention. The game board includes, in miniature, all of the elements present in the large game, including a big island (with the annular path and material storage area), home bases, and small islands. For purposes of illustration, FIG. 9 also shows bridges between the big island and the small islands. The regions containing the home bases is preferably colored light blue, to simulate "water" separating the islands. It is also possible to provide indented bridge "templates", which serve as supports for bridge-building pieces, and which allow the bridge-building elements to snap tightly into their positions.

The game board of FIG. 9 may be constructed as one piece, or it may be modular. For example, one can provide a board that comprises only the big island, and this board could be used for other games, different from the game described herein. The areas containing the small islands can be provided separately, and made to snap onto, or otherwise become fastened to, the main board. The same can be true for the home bases and/or the areas containing them. In the preferred embodiment, for convenience of storage, the basic board is made to be foldable; it can be made to be folded in half twice, so that the board effectively folds into quarters.

In the preferred embodiment, there are 16 game pieces, representing four pieces assigned to each player. The game pieces correspond to the players in the large game. The players of the present game correspond to the leaders of the small teams in the large game. The game pieces are preferably color-coded, or coded in some other manner, so as to distinguish the pieces of one player from those of another. In FIG. 9, the game pieces are identified by different symbols, namely circles 91, squares 92, triangles 93, and parallelograms 94.

The bridge-building elements may include, in the preferred embodiment, a plurality of bases and a plurality of planks. For example, a game set may include 100 bases and 100 planks. The latter numbers should be more than enough to fulfill the needs of all the players.

If there are four players, there should be four dice, one for each player.

In one embodiment of the present game, the object is to be the first player to move all four game pieces around the annular path surrounding the big island, to build a bridge to the small island, and to move all of the pieces across the bridge so that all the pieces are on the small island.

In playing the present game, each player chooses a home base. The home bases are preferably color-coded or otherwise identified so as to be distinguishable from each other. Each player also gathers a set of (preferably four) matching game pieces, and places them in his or her home base starting area. Each player must roll the die, and the player with the highest number goes first.

In one form of play, each player takes a single turn and then moves the pieces according to the number obtained from the die. As in the large game, the player has discretion about which piece to move; a player can decide to move a piece which is already in the annular path, or a piece which has not yet entered the annular path. The pieces are preferably moved clockwise, with the first space counting as a move. In an alternative form of play, all players proceed at the same time, creating the chaotic effect obtained in the large game. In either case, there is a time limit, preferably 20 minutes per game.

The rules governing the bridge-building elements are essentially the same as in the large game. A color-coded rules card may be provided for each player, to remind the player of the following rules. FIG. 9 illustrates the rules card in block 95, which clearly summarizes the rules associated with each color-coded space. If a piece lands on a blue space, the player takes a bridge-building element from the material storage area (unless there are no such elements available). If a piece lands on a green space, the player puts one of his or her bridge-building elements back in the material storage area (unless the player has no such elements). If a piece lands on a red space, the player must steal a bridge-building element from another player, if it is possible to do so. If a piece lands on a yellow space, the player must give a bridge-building element, if available, to another player.

As in the large game, each player must carefully analyze the board, and determine which game piece should be moved to obtain the maximum advantage in gathering as many bridge-building elements as possible.

By analogy to the large game, each player may have his or her game pieces on any space at any time. Also, multiple players may have their pieces on any space at any time, according to the results of the roll of the dice. However, in the present game, there is preferably a limit of four pieces per space. If a player obtains a number that would cause more than four pieces to be on a single space, the player may not make that move, and must make another move or wait for another turn.

Pieces can be moved only from the annular path to the small island by "walking" on the bridges built by the respective players. In the preferred embodiment, the first piece must complete a circuit around the board before the player can start to build the bridge. In an alternative embodiment, especially suited to small children, the players may start to build the bridge immediately, and the player who is first to build the bridge (or, in another variation, the first to build the bridge and land one game piece on the small island) wins the game. If a player needs more bridge-building elements, he or she may continue to move one or more game pieces around the big island, as necessary. Once a player has started to build a bridge, the other players are prohibited from taking bridge-building elements from the bridge after such elements have been laid in place. In an alternative embodiment, the latter rule does not apply, and players may take bridge-building elements while bridges are being built.

Players move across the bridge by moving game pieces by a number of spaces corresponding to the number obtained by the roll of the die. The term "space", when used in describing movements across the bridge, refers to a single bridge-building element. A game piece cannot land on the small island without obtaining the exact number required to land on that island. For example, if a game piece is three spaces away from the small island, and if a roll of the die produces a number greater than three, the game piece may not move. If a roll of the die produces a three, the game piece can land on the island. If the number is less than three, the game piece may be advanced by the indicated number of spaces.

The game described above may be played by teams of players. For example, pairs of players may compete against each other, by prior agreement of the players. Moreover, up to 16 individuals may play the game at one time by having four persons play on each team, each team member being associated with one game piece. Teams may form alliances with each other to alter the structure of the competition. The preferred maximum number of teams is four, the same number as the preferred maximum number of players.

Although the above-described "small" game is identical, in theory, to the large game described previously, the small game is completely different in its ultimate outcome. The small game can be played by children as young as about 6, or by adults, and provides simple board game fun. For young children playing the variation in which bridge building can begin almost immediately, the players can have fun by building bridges without thinking about higher-level strategies. Teenage and adult players can add many levels of complexity to the basic game, by creating alliances among teams, and/or by perfecting strategies for moving pieces around the board. By strategically giving materials to "allies" and holding back key materials from opponents, the older players can also have a great amount of fun. Persons of all ages can learn some key points about teamwork, communication, and strategic planning from this game.

The game of the present invention can be modified in many ways. The path taken by the players or game pieces need not be annular, but can comprise the perimeter of a square, a rectangle, or some other shape. The spaces on the path need not be color-coded, but could be provided with other kinds of distinguishing indicia. Also, the teams themselves need not be identified by colors, but could be given names, letters, numbers, or any other symbol that distinguishes one team from another. The invention is also not limited by the nature of the bridge-building elements. Many different kinds of bridge-building elements can be used. These and other similar modifications should be considered within the spirit and scope of the following claims.

What is claimed is:

1. A method of playing a game, comprising:
a) providing a playing area having a path including a plurality of coded spaces, a material storage area, a plurality of home bases, and a plurality of small islands,
b) forming teams of players associated with each home base, each team including a leader who determines a series of random numbers controlling movements of other players of the team,
c) directing players along the path in accordance with numbers determined by the leader, wherein players accumulate bridge-building elements stored in the material storage area, according to spaces on the path reached by the players, and
d) using the bridge-building elements to build simulated bridges between the path and one of the small islands.

2. The method of claim 1, further comprising associating, with each space in the path, one of four possible codes, a first code requiring a player to take a bridge-building element from the material storage area, a second code requiring a player to put back a bridge-building element in the material storage area, a third code requiring a player to steal a bridge-building element from another team, and a fourth code requiring a player to give a bridge-building element to another team.

3. The method of claim 2, wherein the codes are selected to be color codes.

4. The method of claim 1, further comprising permitting players of a team to build a bridge only after the players have traversed the path at least once.

5. The method of claim 1, further comprising requiring players to travel between the path and the small islands.

6. The method of claim 5, further comprising directing players to solve a puzzle located on the small islands.

7. The method of claim 1, wherein steps (c) and (d) are performed simultaneously by all of the teams.

8. A method of playing a game, comprising:
  a) directing a plurality of players along a path in a playing area, the players being divided into a plurality of teams, the players of each team being instructed to accumulate a plurality of bridge-building elements in accordance with instructions associated with coded spaces on the path,
  b) causing players of each team to build a bridge, using the bridge-building elements, between the path and a region designated as a small island, and
  c) directing players of each team to traverse the bridge, so as to retrieve puzzle pieces located on each small island.

9. The method of claim 8, further comprising associating, with each space in the path, one of four possible codes, a first code requiring a player to take a bridge-building element from the material storage area, a second code requiring a player to put back a bridge-building element in the material storage area, a third code requiring a player to steal a bridge-building element from another team, and a fourth code requiring a player to give a bridge-building element to another team.

10. The method of claim 9, wherein the codes are selected to be color codes.

11. The method of claim 8, further comprising permitting players of a team to build a bridge only after the players have traversed the path at least once.

12. The method of claim 8, wherein step (a) includes directing players from a plurality of teams simultaneously, and wherein step (b) includes allowing a plurality of players to from a plurality of teams simultaneously.

13. A method of playing a game comprising directing a plurality of players along a path having coded spaces, wherein the players accumulate bridge-building elements according to instructions associated with said coded spaces, and directing the players to use the bridge-building elements to build bridges between the path and at least one small island spaced apart from the path.

14. The method of claim 13, further comprising instructing the players to retrieve a plurality of puzzle pieces stored on said small island, and to arrange the puzzle pieces to obtain a message.

15. Apparatus for playing a management training game, comprising:
  a) a playing area, the playing area having a path including a plurality of coded spaces, a material storage area, a plurality of home bases, and a plurality of small islands,
  b) means for determining a plurality of random numbers, and
  c) a plurality of bridge-building elements located in the material storage area.

16. The apparatus of claim 15, wherein the coded spaces are color-coded.

17. The apparatus of claim 15, wherein the home bases comprise tables.

18. The apparatus of claim 15, wherein the random number determining means comprises at least one die.

19. The apparatus of claim 15, wherein the bridge-building elements include base supports and planks.

20. The apparatus of claim 15, wherein there is a bag on each small island, and wherein each bag contains a plurality of puzzle pieces.

21. The apparatus of claim 15, wherein the path, the material storage area, the plurality of home bases, and the plurality of small islands are all formed on a portable game board.

22. The apparatus of claim 21, further comprising a plurality of sets of movable game pieces.

23. The apparatus of claim 15, wherein the path comprises an annulus.

24. Apparatus for playing a management training game, comprising:
  a) a playing area, the playing area having a path including a plurality of color-coded spaces, a material storage area, a plurality of tables arranged in a vicinity of the path, and a plurality of small islands,
  b) means for determining a plurality of random numbers, and
  c) a plurality of bridge-building elements located in the material storage area.

25. The apparatus of claim 24, wherein the random number determining means comprises at least one die.

26. The apparatus of claim 25, wherein the bridge-building elements include base supports and planks.

27. The apparatus of claim 26, wherein there is a bag on each small island, and wherein each bag contains a plurality of puzzle pieces.

28. The apparatus of claim 24, wherein the path, the material storage area, the plurality of home bases, and the plurality of small islands are all formed on a portable game board.

29. The apparatus of claim 28, further comprising a plurality of sets of movable game pieces.

* * * * *